(12) United States Patent
Sanders et al.

(10) Patent No.: US 8,706,299 B2
(45) Date of Patent: Apr. 22, 2014

(54) METHOD AND SYSTEM FOR CONTROLLING A DEXTEROUS ROBOT EXECUTION SEQUENCE USING STATE CLASSIFICATION

(75) Inventors: Adam M. Sanders, Holly, MI (US); Robert J. Platt, Jr., Cambridge, MA (US); Nathaniel Quillin, League City, TX (US); Frank Noble Permenter, Webster, TX (US); Joseph Pfeiffer, Las Cruses, NM (US)

(73) Assignees: GM Global Technology Operations LLC, Detroit, MI (US); The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 359 days.

(21) Appl. No.: 13/196,252

(22) Filed: Aug. 2, 2011

(65) Prior Publication Data
US 2013/0035792 A1 Feb. 7, 2013

(51) Int. Cl.
*G05B 15/00* (2006.01)
*G05B 19/00* (2006.01)

(52) U.S. Cl.
USPC ........... 700/258; 700/246; 700/247; 700/260; 700/261; 700/262; 700/263; 700/264

(58) Field of Classification Search
USPC ......... 700/258, 246, 247, 260, 261, 262, 263, 700/264; 901/2, 3, 5, 8, 9, 10, 14, 19, 23, 901/27, 28, 29, 30, 31, 33, 34, 35, 36, 38; 706/12, 13, 14, 15, 20, 22, 25, 30, 45
See application file for complete search history.

(56) References Cited

U.S. PATENT DOCUMENTS 5,280,265 A * 1/1994 Kramer et al. ................ 338/210
5,442,729 A * 8/1995 Kramer et al. ................ 704/271

(Continued)

FOREIGN PATENT DOCUMENTS

JP 2003346152 A 5/2003
JP 2007265103 A 11/2007

OTHER PUBLICATIONS

Pelossof, R. ; Miller, A. ; Allen, P. ; Jebara, T. ; "An SVM learning approach to robotic grasping" Robotics and Automation, 2004. Proceedings. ICRA '04. 2004 IEEE International Conference on (vol. 4 ).*

(Continued)

*Primary Examiner* — Khoi Tran
*Assistant Examiner* — Jorge Peche
(74) *Attorney, Agent, or Firm* — Quinn Law Group, PLLC

(57) ABSTRACT

A robotic system includes a dexterous robot and a controller. The robot includes a plurality of robotic joints, actuators for moving the joints, and sensors for measuring a characteristic of the joints, and for transmitting the characteristics as sensor signals. The controller receives the sensor signals, and is configured for executing instructions from memory, classifying the sensor signals into distinct classes via the state classification module, monitoring a system state of the robot using the classes, and controlling the robot in the execution of alternative work tasks based on the system state. A method for controlling the robot in the above system includes receiving the signals via the controller, classifying the signals using the state classification module, monitoring the present system state of the robot using the classes, and controlling the robot in the execution of alternative work tasks based on the present system state.

15 Claims, 2 Drawing Sheets

(56) References Cited

U.S. PATENT DOCUMENTS

| | | | | |
|---|---|---|---|---|
| 5,813,406 | A * | 9/1998 | Kramer et al. | 600/595 |
| 6,035,274 | A * | 3/2000 | Kramer et al. | 704/270 |
| 6,447,719 | B1 * | 9/2002 | Agamohamadi et al. | 422/22 |
| 6,556,892 | B2 * | 4/2003 | Kuroki et al. | 700/245 |
| 6,701,296 | B1 * | 3/2004 | Kramer et al. | 704/270 |
| 6,832,131 | B2 * | 12/2004 | Hattori et al. | 700/245 |
| 7,013,201 | B2 * | 3/2006 | Hattori et al. | 700/245 |
| 7,112,938 | B2 * | 9/2006 | Takenaka et al. | 318/568.12 |
| 7,379,568 | B2 * | 5/2008 | Movellan et al. | 382/118 |
| 7,587,069 | B2 * | 9/2009 | Movellan et al. | 382/118 |
| 7,624,076 | B2 * | 11/2009 | Movellan et al. | 706/12 |
| 8,250,901 | B2 * | 8/2012 | Davis et al. | 73/1.75 |
| 8,280,837 | B2 * | 10/2012 | Platt et al. | 706/52 |
| 8,291,788 | B2 * | 10/2012 | Ihrke et al. | 74/490.05 |
| 8,442,684 | B2 * | 5/2013 | Davis et al. | 700/261 |
| 8,443,694 | B2 * | 5/2013 | Ihrke et al. | 74/490.05 |
| 8,511,964 | B2 * | 8/2013 | Linn et al. | 414/680 |
| 2002/0195330 | A1 * | 12/2002 | Agamohamadi et al. | 204/164 |
| 2004/0117063 | A1 * | 6/2004 | Sabe et al. | 700/245 |
| 2005/0102246 | A1 * | 5/2005 | Movellan et al. | 706/12 |
| 2006/0082944 | A1 * | 4/2006 | Koyanagi et al. | 361/93.1 |
| 2008/0235165 | A1 * | 9/2008 | Movellan et al. | 706/12 |
| 2008/0247598 | A1 * | 10/2008 | Movellan et al. | 382/100 |
| 2009/0148035 | A1 * | 6/2009 | Ohno et al. | 382/153 |
| 2011/0067479 | A1 * | 3/2011 | Davis et al. | 73/1.75 |
| 2011/0067517 | A1 * | 3/2011 | Ihrke et al. | 74/490.03 |
| 2011/0067521 | A1 * | 3/2011 | Linn et al. | 74/490.06 |
| 2011/0071672 | A1 * | 3/2011 | Sanders et al. | 700/245 |

OTHER PUBLICATIONS http://robotics.nasa.gov/courses/fall2002/event/oct1/NASA_Robotics_20021001.htm.

* cited by examiner

METHOD AND SYSTEM FOR CONTROLLING A DEXTEROUS ROBOT EXECUTION SEQUENCE USING STATE CLASSIFICATION

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present disclosure relates to the automatic control of a dexterous robot.

BACKGROUND

Robots are electro-mechanical devices which can be used to manipulate objects via a series of links. The links are interconnected by articulations or actuator-driven robotic joints. Each joint in a typical robot represents an independent control variable or degree of freedom (DOF). End-effectors are the particular links used to perform a given work task, such as grasping a work tool or otherwise acting on an object. Precise motion control of a robot through its various DOF may be organized by task level: object level control, i.e., the ability to control the behavior of an object held in a single or cooperative grasp of the robot, end-effector control, and joint-level control. Collectively, the various control levels cooperate to achieve the required robotic dexterity and work task-related functionality.

The structural complexity of a dexterous robot is largely dependent upon the nature of the work task. During object manipulation, it is necessary to track the manipulator with respect to its environment, i.e., the system state. Without such tracking, the robot remains ignorant of the outcome of its actions during a given work sequence. However, for dexterous robots having a relatively high number of DOF, the monitoring and tracking of the system state is a highly complicated endeavor. Hundreds of individual sensor signals are commonly encountered, with difficulty arising in the processing and determination of the relevance of the various sensor signals to the ultimate determination of the present system state. Thus, existing robot control systems and control methodologies may be less than optimal when used for state tracking and monitoring of a relatively high DOF dexterous robot.

SUMMARY

Accordingly, a robotic system is disclosed herein having a dexterous robot and a controller. The robot has a relatively high number of degrees of freedom (DOF), e.g., at least 42 DOF in one example embodiment. The controller is configured to provide a tactile feedback loop that can be used to adapt an automated sequence of the robot. That is, the controller tracks the state of the robot and its operating environment during manipulation using a logic layer. The logic layer enables the robot to execute an arbitrary number of execution paths based on the outcome of the current actions. This knowledge is then used to wrap adaptive control around a given task or sequence.

The state sequence is determined during a learning phase, during which actual sensor measurements made during task execution are stored in tangible, non-transitory memory of the controller. These measurements are then processed by a Support Vector Machine (SVM). Evaluation of system state during task execution can be used by the controller as a completion condition for subsequent task steps, or to take alternative actions.

In particular, a robotic system includes a dexterous robot and a controller. The robot includes a plurality of robotic joints, actuators configured for moving the robotic joints, and sensors configured for measuring a characteristic of a corresponding one of the robotic joints, e.g., position, and transmitting the characteristics as sensor signals. The controller includes tangible, non-transitory memory on which is recorded computer-executable instructions, including a state classification module, a processor configured for executing the instructions from the tangible, non-transitory memory, classifying the sensor signals into at least two distinct classes using the state classification module, e.g., a Support Vector Machine (SVM), monitoring a system state of the robot using the classes, and controlling the robot in the execution of alternative work tasks based on the system state.

A method for controlling the dexterous robot noted above includes receiving the sensor signals using the controller, classifying the sensor signals into at least two distinct classes using the state classification module, monitoring a present system state of the robot using the classes, and controlling the robot in the execution of alternative work tasks based on the present system state.

A controller is also disclosed herein which is configured for executing the above method. The controller includes a host machine in communication with the robot, and configured for receiving the sensor signals. The controller also includes a processor and tangible, non-transitory memory on which is recorded computer-executable instructions, including the state classification module. The processor executes the instructions to thereby execute the present method as detailed herein.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
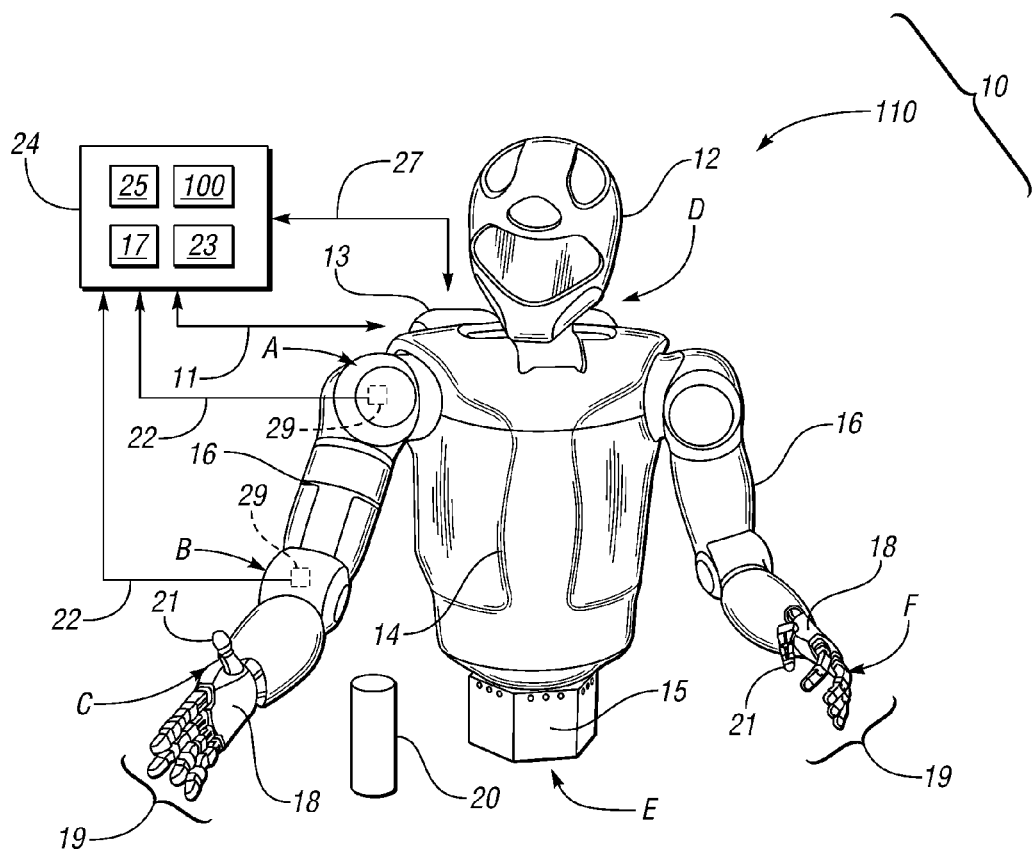
FIG. 1 is a schematic illustration of a robotic system having a controller which uses state classification data in the control of a dexterous robot during execution of a work task or sequence.

With reference to the drawings, wherein like reference numbers refer to the same or similar components throughout the several views, an example robotic system 10 is shown in FIG. 1. The robotic system 10 includes a dexterous robot 110 and a controller 24. As will be explained in detail below with reference to FIGS. 2 and 3, the present controller 24 is configured for controlling the behavior of the robot 110 as the robot executes a given work task or sequence. The controller 24 does so in part by using state classification data generated using a state classification module 23, for instance a Support Vector Machine (SVM) or other suitable state estimation technique.

The robot 110 shown of FIG. 1 may be configured as a humanoid in one possible embodiment. The use of humanoids may be advantageous where direct interaction is required between the robot 110 and any devices or systems that are specifically intended for human use or control. Such robots typically have an approximately human structure or appearance in the form of a full body, or a torso, arm, and/or hand, depending on the required work tasks.

The robot 110 may include a plurality of independently and interdependently-moveable compliant robotic joints, such as but not limited to a shoulder joint (indicated generally by arrow A), an elbow joint (arrow B), a wrist joint (arrow C), a neck joint (arrow D), and a waist joint (arrow E), as well as the various finger joints (arrow F) positioned between the phalanges of each robotic finger 19. Each robotic joint may have one or more degrees of freedom (DOF).

For example, certain joints such as a shoulder joint (arrow A), an elbow joint (arrow B), and a wrist joint (arrow C) may have at least two DOF in the form of pitch and roll. Likewise, the neck joint (arrow D) may have at least three DOF, while the waist and wrist (arrows E and C, respectively) may have one or more DOF. Depending on the level of task complexity, the robot 110 may move with over 42 DOF, as is possible with the example embodiment shown in FIG. 1. Such a high number of DOF is characteristic of a dexterous robot, which as used herein means a robot having human-like levels of dexterity, for instance with respect to the human-like levels of dexterity in the fingers 19 and hands 18.

Although not shown in FIG. 1 for illustrative clarity, each robotic joint contains and is driven by one or more joint actuators, e.g., motors, linear actuators, rotary actuators, electrically-controlled antagonistic tendons, and the like. Each joint also includes one or more sensors 29, with only the shoulder and elbow sensors shown in FIG. 1 for simplicity. The sensors 29 measure and transmit sensor signals (arrows 22) to the controller 24, where they are recorded in computer-readable memory 25 and used in the monitoring and tracking of changing system states during the execution of a given work task sequence.

When configured as a humanoid, the robot 110 may include a head 12, a torso 14, a waist 15, arms 16, hands 18, fingers 19, and thumbs 21. The robot 110 may also include a task-suitable fixture or base (not shown) such as legs, treads, or another moveable or stationary base depending on the particular application or intended use of the robot 110. A power supply 13 may be integrally mounted with respect to the robot 110, e.g., a rechargeable battery pack carried or worn on the torso 14 or another suitable energy supply, may be used to provide sufficient electrical energy to the various joints for powering any electrically-driven actuators used therein. The power supply 13 may be controlled via a set of power control and feedback signals (arrow 27).

Still referring to FIG. 1, the present controller 24 provides precise motion and systems-level control over the various integrated system components of the robot 110 via control and feedback signals (arrow 11), whether closed or open loop. Such components may include the various compliant joints, relays, lasers, lights, electro-magnetic clamps, and/or other components used for establishing precise control over the behavior of the robot 110, including control over the fine and gross movements needed for manipulating an object 20 grasped by the fingers 19 and thumb 21 of one or more hands 18. The controller 24 is configured to control each robotic joint in isolation from the other joints, as well as to fully coordinate the actions of multiple joints in performing a more complex work task.

The controller 24 may be embodied as one or multiple digital computers or host machines each having one or more processors 17, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 25 may include any non-transitory/tangible medium which participates in providing data or computer-readable instructions. Memory 25 may be non-volatile or volatile. Non-volatile media may include, for example, optical or magnetic disks and other persistent memory. Example volatile media may include dynamic random access memory (DRAM), which may constitute a main memory. Other examples of embodiments for memory 25 include a floppy, flexible disk, or hard disk, magnetic tape or other magnetic medium, a CD-ROM, DVD, and/or any other optical medium, as well as other possible memory devices such as flash memory.

The controller 24 includes a state classification module 23. Module 23 may be embodied as, for example, a Support Vector Machine (SVM) or other logic layer suitable for determining the present state of the robotic system 10 from measured sensor signals (arrows 22) as explained below. Computer-executable instructions for implementing the present method 100 may be recorded in memory 25, and are executable by the processor(s) 17 of the controller 24 using associated hardware elements of the controller 24. An example embodiment of the present method 100 appears in FIG. 3, and is described in detail below.

The state classification module 23 may be embodied as a logic layer and selectively executed by the controller 24 during one or more phases of supervised machine learning, as is well understood in the art. The use of module 23 allows the controller 24 to effectively analyze data and recognize patterns presented by input data, such as the various sensor signals (arrows 22) received from the robot 110 in the course of executing a work task or sequence.

In one embodiment, the state classification module 23 is configured as an SVM, which is also commonly described as a non-probabalistic binary linear classifier. However, those of ordinary skill in the art will appreciate that other approaches may be used without departing from the intended inventive scope. For example, the state classification module 23 may be alternatively embodied as a neural network, a logistic regression model, a Naïve Bayes classifier, a perceptron network, and a k-nearest neighbor algorithm, etc., with each term being well known in the art. The embodiment of SVM will be used hereinafter for illustrative consistency.

For each input, the SVM can predict into which of at least two data classes or categories a particular input value properly fits. Given a sufficiently large and informative set of training samples, each with an associated classification, the controller 24 can thereafter use the SVM to accurately classify each new sample of sensor signals (arrows 22) when executing a given work sequence.

Figure 2:
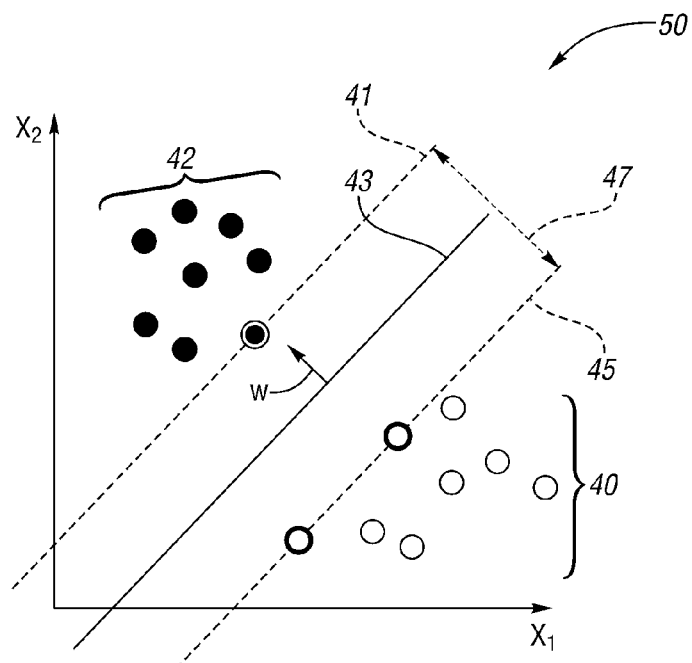
FIG. 2 is a schematic plot of parallel hyperplanes generated by a Support Vector Machine in the classification of sensor inputs within the system shown in FIG. 1.

Referring to FIG. 2, a plot 50 is shown to further explain the classification process of an SVM embodiment of the state classification module 23. An example class could be "robot 110 holding the object 20" of FIG. 1. Another example class could be "robot 110 not holding the object 20". The x1 and x2 axes represent inputs from the sensors 29, two of which are shown in FIG. 1. Thus, in FIG. 2, a first class is represented by cluster 40 and a second class is represented by cluster 42.

SVM separates classes by finding values w and b, such that the line defined by the equation w·x−b=0 (line 43), also referred to in the art as a hyperplane, maximizes the distance (line 47) between the classes 40, 42. Note that w and x are vectors, e.g., 2-dimensional for the example depicted in FIG. 1, and w·x is the vector dot product. In some cases, there can be no line w·x−b separating the classes. In this case, the controller 24 can apply a coordinate transformation to the sensor inputs x=(x1, x2) such that the classes can be separated by a line in the transformed space, as understood in the art. Such a coordinate transformation may be used to optimize performance of the SVM approach. One possible transform is the Radial Basis Function (RBF) kernel.

The controller 24 initially may execute a training/learning phase, during which actual sensor measurements (arrows 22 of FIG. 1) are processed by the SVM and recorded in memory 25. The SVM first calculates a hyperplane, i.e., line 43. Parallel lines or hyperplanes 41 and 45 are then defined by the controller 24 using respective equations (w·x−b=1) and (w·x−b=−1). The values for w and b should be chosen to maximize the margin or separation between hyperplanes or lines 41 and 45 so as to minimize the chance of error in a given sensor value classification.

Figure 3:
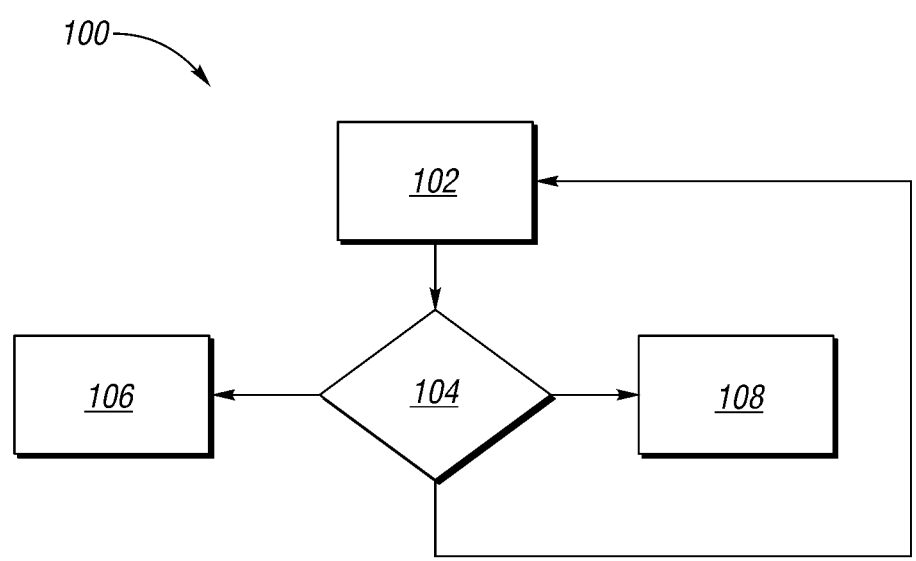
FIG. 3 is flow chart describing an example control approach for tracking the system state within the robotic system of FIG. 1.

Referring to FIG. 3 in conjunction with the plot 50 shown in FIG. 2, an example embodiment of the present method 100 begins at step 102 when the robot 110 of FIG. 1 executes a work task, whether in a teaching/learning phase or in the execution of an actual work task. Upon executing the task at step 102, the controller 24 of FIG. 1 proceeds to step 104.

At step 104, the controller 24 records a set of sensor measurements, e.g., by recording the various sensor signals (arrows 22) of FIG. 1 in memory 25. The controller 24 may then process the set of sensor signals (arrows 22) using the module 23, for instance the SVM described above, or using any other suitable alternate predictive means.

Step 104 may entail comparing the sensor measurements to prior-recorded lasses or classifications, such as the example classes 40 and 42 shown in FIG. 2, and then placing the measurements in one of these different classes using existing knowledge from the prior training phases. Once the system state has been properly identified, the controller 24 proceeds to steps 106 or 108, which represent two possible divergent work tasks which may or may not be available depending on the present system state.

For example, step 106 may entail rotating the object 20 of FIG. 1 in a cooperative grasp into a predetermined position, and step 108 may entail welding the same object 20 to a stationary surface. In this hypothetical example, step 106 may only occur when the robot 110 is in a first system state, and step 108 may only occur when the robot 110 is in a second system state. Thus, proper state classification at step 104 is essential to enabling the robot 110 to transition through an arbitrary number of execution paths based on the outcome of its current actions.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
 a dexterous robot having a plurality of robotic joints, actuators configured for moving the robotic joints, and sensors configured for measuring a characteristic of a corresponding one of the robotic joints, and for transmitting the characteristics as a second set of sensor signals; and
 a controller configured for receiving the sensor signals, wherein the controller includes a state classification module and:
  tangible, non-transitory memory on which is recorded a plurality of classes of a first set of sensor signals and computer-executable instructions for executing a first or second divergent work task from an arbitrary number of possible task execution paths; and
  a processor configured for executing the instructions from the tangible, non-transitory memory to thereby cause the controller to:
   receive the second set of sensor signals from the sensors;
   classify the received second set of sensor signals into one of the recorded classes via the state classification module;
   determine a present system state of the robot using the class of the classified received signals; and
   execute the first or second divergent work task when the determined present system state of the robot is a respective first or second system state.

2. The robotic system of claim 1, wherein the controller is configured for processing, via the processor, actual sensor measurements taken by the plurality of sensors during execution of a training phase of the state classification module.

3. The robotic system of claim 1, wherein the state classification module is a Support Vector Machine which calculates a hyperplane or line separating the classes in an input space of the plurality of sensors.

4. The robotic system of claim 3, wherein the Support Vector Machine selectively uses a Radial Basis Function kernel as a coordinate transformation.

5. The robotic system of claim 1, wherein the dexterous robot is a humanoid robot having at least 42 degrees of freedom.

6. A method for controlling a dexterous robot, wherein the robot includes a plurality of robotic joints, actuators configured for moving the robotic joints, and sensors configured for measuring a characteristic of a corresponding one of the robotic joints, including a position of each joint used in the execution of a work task or sequence, and for transmitting the characteristics as a first set of sensor signals, the method comprising:
 recording a plurality of classes of a second set of sensor signals in tangible, non-transitory memory of a controller having a state classification module and a processor;
 receiving the first set sensor signals via the controller;
 classifying the received first set of sensor signals, via the state classification module of the controller, into one of the plurality of classes;
 determining a present system state of the robot using the class of the classified sensor signals; and
 executing, via the controller, one of a first and a second divergent work task from an arbitrary number of possible task execution paths of the robot when the determined present system state of the robot is a respective first and second system state.

7. The method of claim 6, further comprising:
 processing, via the processor of the controller, the second set of sensor measurements taken by the sensors during execution of a training phase of the state classification module.

8. The method of claim 7, further comprising:
calculating a hyperplane or line separating the classes in an input space of the sensors using the state classification module.

9. The method of claim 8, wherein calculating a hyperplane or line includes using one of: a Support Vector Machine (SVM), a neural network, a logistic regression model, a Naïve Bayes classifier, a perceptron network, and a k-nearest neighbor algorithm.

10. The method of claim 9, wherein calculating a hyperplane or line includes using the SVM, the method further comprising:
selectively using a Radial Basis Function kernel as a coordinate transformation to thereby optimize the performance of the SVM.

11. The method of claim 6, wherein executing one of a first and a second divergent work task includes controlling a humanoid robot having at least 42 degrees of freedom through at least two alternative work tasks.

12. A controller for use within a robotic system having a dexterous robot, wherein the robot includes a plurality of robotic joints, actuators configured for moving the robotic joints, and sensors configured for measuring a characteristic of a corresponding one of the robotic joints, and for transmitting the characteristics as a second set of sensor signals, the controller comprising:
a host machine in communication with the robot, and configured for receiving the second set of sensor signals, the host machine including a state classification module;
tangible, non-transitory memory on which is recorded computer-executable instructions and a plurality of classes of a first set of sensor signals; and
a processor configured for:
executing the instructions from the tangible, non-transitory memory to thereby cause the host machine to:
receive the first set of signals;
classify the received first set of sensor signals into one of the plurality of classes via the state classification module;
determine a present system state of the robot using the class of the received first set of sensor signals; and
execute one of a first or second divergent work task when the determined present system state of the robot is a respective first or second system state.

13. The controller of claim 12, wherein the first set of sensor signals are measured by the sensors during execution of a training phase of the state classification module.

14. The controller of claim 12, wherein the state classification module is a Support Vector Machine which calculates a hyperplane or line separating the classes in an input space of the plurality of sensors.

15. The controller of claim 14, wherein the Support Vector Machine selectively uses a Radial Basis Function kernel as a coordinate transformation.

* * * * *